United States Patent
Jose

(10) Patent No.: US 10,459,944 B2
(45) Date of Patent: Oct. 29, 2019

(54) SYNCHRONIZING HIERARCHICAL INFORMATION WHILE PRESERVING TEAM STRUCTURE

(71) Applicant: Microsoft Technology Licensing, LLC, Redmond, WA (US)

(72) Inventor: Rinaldo Alcova Jose, San Jose, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 808 days.

(21) Appl. No.: 15/099,100

(22) Filed: Apr. 14, 2016

(65) Prior Publication Data
US 2017/0300547 A1    Oct. 19, 2017

(51) Int. Cl.
G06F 16/27    (2019.01)

(52) U.S. Cl.
CPC ............ G06F 16/27 (2019.01); G06F 16/273 (2019.01)

(58) Field of Classification Search
CPC ....................................................... G06F 16/27
See application file for complete search history.

(56) References Cited

U.S. PATENT DOCUMENTS

| | | | | |
|---|---|---|---|---|
| 5,647,058 A * | 7/1997 | Agrawal | ............... | G06K 9/6232 |
| 5,767,854 A * | 6/1998 | Anwar | ................... | G06F 3/0481 |
| | | | | 715/848 |
| 8,706,692 B1 * | 4/2014 | Luthra | ..................... | G06F 16/27 |
| | | | | 707/622 |
| 2005/0075917 A1 * | 4/2005 | Flores | ................... | G06Q 10/06 |
| | | | | 705/7.11 |
| 2007/0282655 A1 * | 12/2007 | Jaluka | ................... | G06Q 10/06 |
| | | | | 705/7.14 |
| 2010/0262550 A1 * | 10/2010 | Burritt | .................. | G06Q 30/02 |
| | | | | 705/319 |
| 2012/0030126 A1 * | 2/2012 | McCagg | ................ | G06Q 10/00 |
| | | | | 705/321 |
| 2012/0246112 A1 * | 9/2012 | Gonzalez | ............. | G06F 21/604 |
| | | | | 707/610 |
| 2013/0246353 A1 * | 9/2013 | Didcock | ............. | H04L 67/2852 |
| | | | | 707/624 |
| 2013/0282705 A1 * | 10/2013 | Barhate | ................... | G06F 16/23 |
| | | | | 707/723 |
| 2015/0135043 A1 * | 5/2015 | Apps | ...................... | G06Q 10/10 |
| | | | | 715/202 |
| 2016/0098666 A1 * | 4/2016 | Hojby | ............ | G06Q 10/063112 |
| | | | | 705/7.14 |

* cited by examiner

*Primary Examiner* — James Trujillo
*Assistant Examiner* — Hubert Cheung
(74) *Attorney, Agent, or Firm* — Schwegman Lundberg & Woessner, P.A.

(57) ABSTRACT

In an example embodiment, a solution is provided that synchronizes data from a lower-dimensionality projection of a high-dimensionality database with another high-dimensionality database in a manner that recreates information lost during the projection process as well as generates new high-dimensionality information from the lower dimensionality project. This allows, for example, for project team information, which was never contained in a database storing hierarchical reporting structure information, to be automatically generated, as well as for logical team information, which was originally contained in the database storing hierarchical reporting structure information but was lost during the projection process, to be recreated.

20 Claims, 14 Drawing Sheets

SYNCHRONIZING HIERARCHICAL INFORMATION WHILE PRESERVING TEAM STRUCTURE

TECHNICAL FIELD

The present disclosure generally relates to computer technology for solving technical challenges in synchronizing information between two different computer systems. More specifically, the present disclosure relates to the synchronization of hierarchical information between systems while preserving team structure.

BACKGROUND

A situation sometimes occurs where a company or organization will maintain two separate computer/database systems containing overlapping, but not identical, information. One common area in which this occurs is in employee information storage. An organization may have one computer system/database maintaining reporting structure information, i.e., information about who reports to whom in the organization. This is also sometimes known as an organizational chart (or "org chart"). Each node in this reporting structure identifies an employee, and a connection between nodes indicates a manager/managee relationship between the employees as either end of the connection. Separately, the organization may maintain a different computer system/database maintaining project team information, i.e., information about which project team(s) each employee is assigned to. While certain information, such as employee name and other details, might be shared among the different computer systems/databases, the different computer systems/databases are not directly linked; a change that occurs in one does not necessarily get reflected in the other, and when it does, it can quickly get out of date.

It is common for organizations to keep their reporting structure information up-to-date, but changes in the reporting structure oftentimes will not get trickled down to the team structure information. The result is that the two systems are out of synchronization often. The problem is that the process of synchronization can often result in loss of some of the information in each database. The reporting structure information is typically stored at a high level of dimensionality, but is transferred to a lower level of dimensionality, such as a Lightweight Directory Access Protocol (LDAP) service prior to synchronizing with the database maintaining the team information. Some information, therefore, is lost when projecting the high level of dimensionality of the reporting structure information to the LDAP service. It can be technically challenging to recreate this higher dimensionality information when importing it into the database maintaining the team information.

BRIEF DESCRIPTION OF THE DRAWINGS

Some embodiments of the technology are illustrated, by way of example and not limitation, in the figures of the accompanying drawings.

DETAILED DESCRIPTION

Overview

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a solution is provided that synchronizes data from a lower-dimensionality projection of a high-dimensionality database with another high-dimensionality database in a manner that recreates information lost during the projection process as well as generates new high-dimensionality information from the lower dimensionality project. This allows, for example, for project team information, which was never contained in a database storing hierarchical reporting structure information, to be automatically generated, as well as for logical team information, which was originally contained in the database storing hierarchical reporting structure information but was lost during the projection process, to be recreated.

Figure 1:
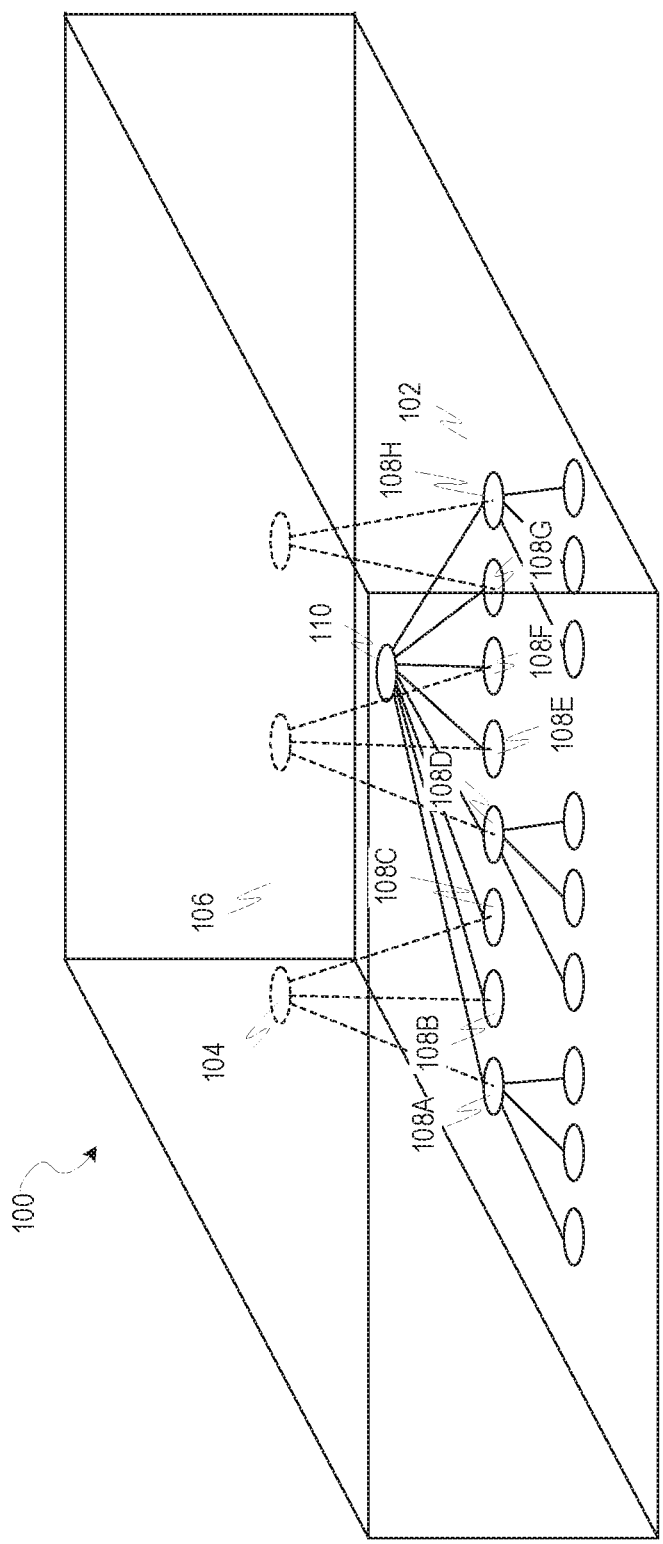
FIG. 1 is a diagram illustrating an example of a high-dimensionality database storing hierarchical reporting structure information in accordance with an example embodiment.

FIG. 1 is a diagram illustrating an example of a high-dimensionality database 100 storing hierarchical reporting structure information in accordance with an example embodiment. For simplicity, this database 100 will be referred to as a "hierarchical reporting structure database"; however, as will be seen, this database 100 is of high dimensionality and includes information other than merely reporting structure information.

The database 100 contains reporting structure information 102, which is depicted in FIG. 1 as a two-dimensional network of nodes and connections between the nodes. Each node, for example, may represent an employee of an organization, while connections between nodes indicate that the employee of one of the nodes reports to the employee of the other of the nodes.

Also depicted is higher dimensionality information, such as logical team information. A logical team is a grouping of nodes at the same level in the two-dimensional network of nodes representing the reporting structure information 102. This logical team information for each team may be stored as a node, such as node 104, in a higher dimension of nodes, depicted as dimension 106. A connection between a higher-level node 104 and a lower level node, such as nodes 108A-108C, indicates that the employees corresponding to the lower dimensionality nodes 108A-108C are part of the logical team described by higher-level node 104. For example, an employee represented by node 110 may have eight employees reporting to him or her (represented by nodes 108A-108H). However, in reality, the employee represented by node 110 may be a manager of three distinct employee teams, say HR, Executive, and Legal. Each of these distinct employee teams (called logical teams) may be represented by a different node in the higher dimension 106. Thus, for example, node 104 may correspond to the FIR team, to which the employees corresponding to nodes 108A-108C belong. Thus, the information in the higher dimension 106 indicates that certain employees reporting to the same employee actually belong to different logical teams than the other employees reporting to the same employee. As will be seen later, this logical team information is lost when projecting the information from the high-dimensionality database to a lower-dimensionality database.

Information stored in each node, such as nodes 108A-108H and node 110 may include, for example, first name, last name, employee identification, title identification, and skill identification. This information may survive the projection to the lower-dimensionality projection and thus would also be included in the lower-dimensionality projection.

Figure 2:
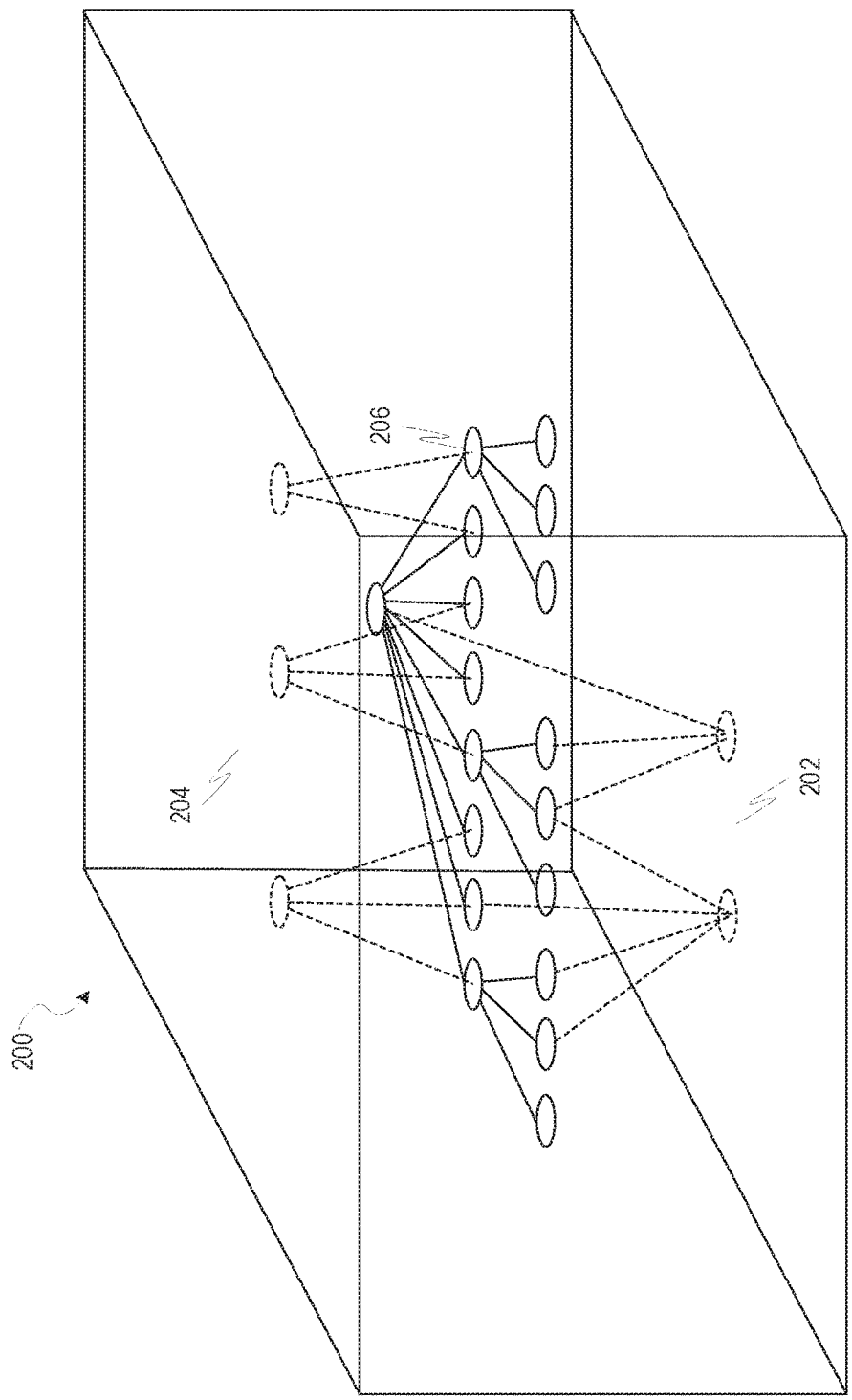
FIG. 2 is a diagram illustrating an example of a high-dimensionality database storing team structure information in accordance with an example embodiment.

FIG. 2 is a diagram illustrating an example of a high-dimensionality database 200 storing team structure information in accordance with an example embodiment. For simplicity, this database 200 will be referred to as a "team structure database"; however, as will be seen, this database 200 is of high-dimensionality and includes information other than merely team structure information. Some of the information in this team structure database 200 is input directly into the database 200, such as project team information 202. Project team information 202 comprises information about which projects particular employees have been assigned to. The database 200 may also include information about logical teams stored as logical team information 204. Project teams are distinct from logical teams in that an employee can be assigned to multiple different project teams simultaneously, whereas an employee can only be assigned to one logical team at a time. The logical team also pertains more to the reporting structure of the organization, and may be thought of in some embodiments as pertaining to the "division", "department", etc. in which the employee works, whereas the project team pertains to a work assignment the employee has been assigned. For example, an employee may be assigned to work on the user interface of a new piece of software the organization is developing (where the software is called, for example, "XYZ software"), and hence may be assigned to the "UI for XYZ team". The same employee may also be assigned to any number of other project teams, such as "backend for XYZ team" and "UI for ABC team". This project team information 202 may be input directly into database 200 by an administrator when, for example, the employee is assigned, or unassigned, to a particular project team.

The team structure database 200 also contains employee information 206, for example an identification of each employee. This information 206 may, however, be out of date frequently as it is common for organizations to frequently update their hierarchical reporting structure database 100, such as when employees are hired or fired, but not to update their team structure database 200 with such frequency.

As will be seen, in an example embodiment, a solution is provided to synchronize a projection of the hierarchical reporting structure database 100 with the team structure database 200 to ensure consistency and also to add information to the team structure database 200 that would otherwise be missing (e.g., logical team information).

Figure 3:
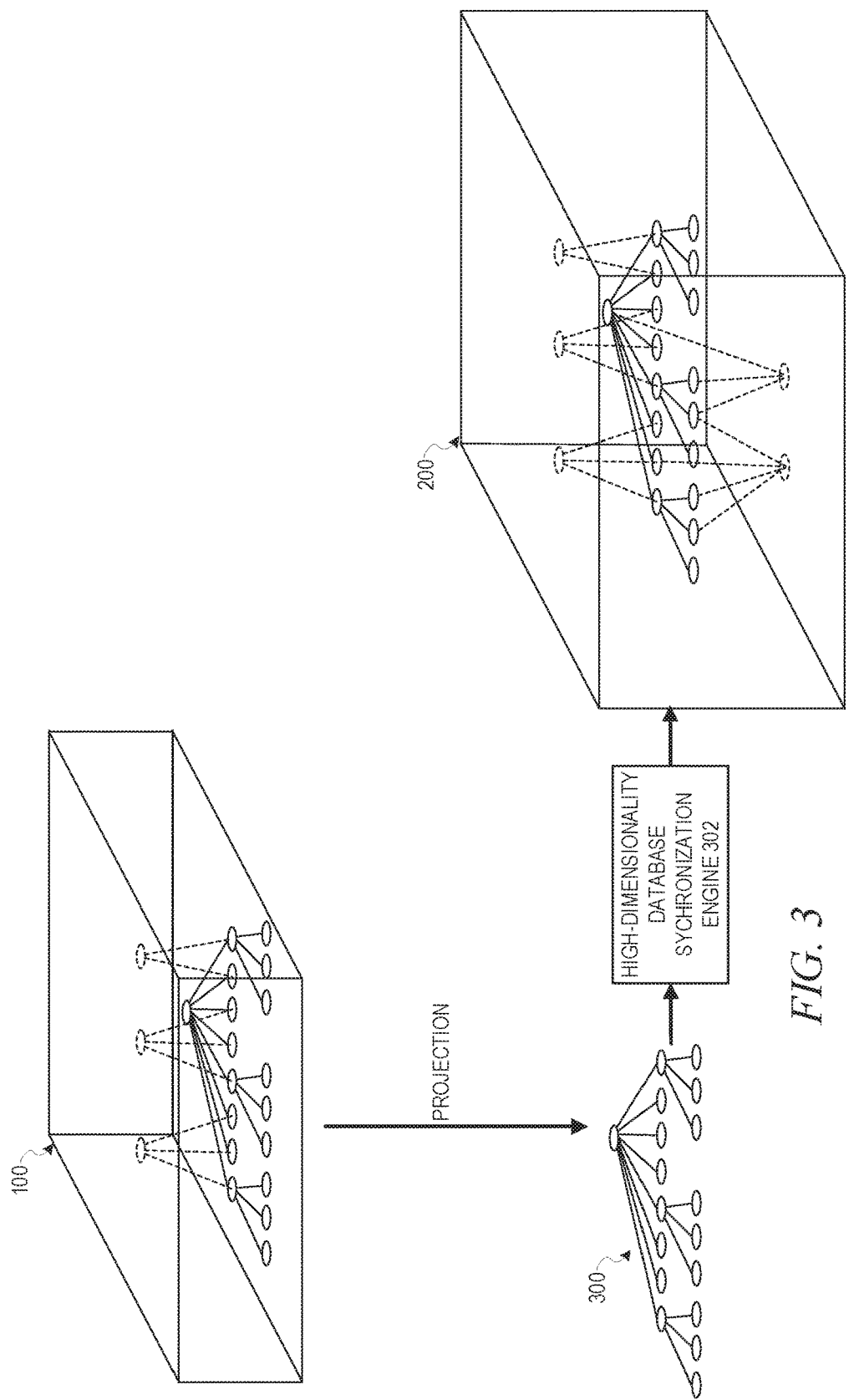
FIG. 3 is a diagram illustrating synchronization of a projection of the hierarchical reporting structure database with the team structure database in accordance with an example embodiment.

FIG. 3 is a diagram illustrating synchronization of a projection 300 of the hierarchical reporting structure database 100 with the team structure database 200 in accordance with an example embodiment. The projection 300 of the hierarchical reporting structure database 100 may be stored in, for example, LDAP format, which loses the information stored in dimension 106 of FIG. 1. In other words, the logical team information 104 is lost and not available in the projection 300, and thus a technical challenge is encountered in that this logical team information 104 cannot be directly retrieved from the hierarchical reporting structure database 100 and yet is important to store in the team structure database 200.

As such, in an example embodiment, a high-dimensionality database synchronization engine 302 is provided to perform various functions relating to synchronizing the information from the hierarchical reporting structure database 100 with the information in the team structure database 200. It should be noted that while the term "synchronization" is utilized, nothing in this document implies that the synchronization must be performed in both directions. In other words, embodiments are foreseen where updates to the hierarchical reporting structure database 100 are synchronized to the team structure database 200, but updates to the team structure database 200 are not synchronized to the hierarchical reporting structure database 100. The high-dimensionality database synchronization engine 302 may be implemented on a computer system such as a computer server, as will be described in more detail later. For ease of discussion, the projection of the hierarchical reporting data structure database 100 will be referred to as a projected reporting structure (PRS).

Figure 4:
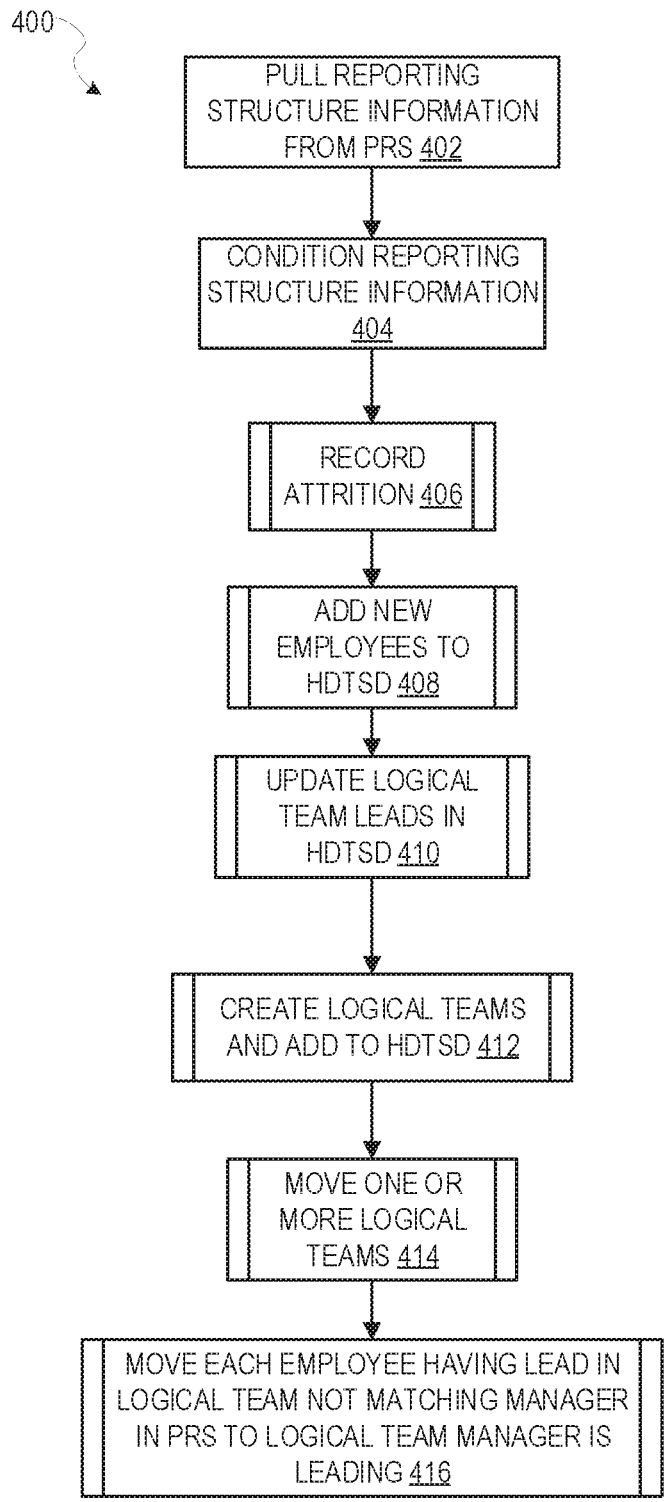
FIG. 4 is a flow diagram illustrating a method of synchronizing information from a high-dimensionality hierarchical reporting structure database to a high-dimensionality team structure database (HDTSD) in accordance with an example embodiment.

FIG. 4 is a flow diagram illustrating a method 400 of synchronizing information from a high-dimensionality hierarchical reporting structure database (e.g., the database 100) to a high-dimensionality team structure database (HDTSD) (e.g., the database 200) in accordance with an example embodiment. It should be noted that since the method 400 may be performed on, for example, a synchronization engine 302, it may not itself perform the projection of the reporting structure information (e.g., the reporting structure information 102) from the high-dimensionality hierarchical reporting structure database to a lower-dimensionality projection of the reporting structure.

At operation 402, reporting structure information 102 may be pulled from a lower-dimensionality projection of information in the high-dimensionality hierarchical reporting structure database 100. This may include, for example, pulling data from an LDAP server. At operation 404, the reporting structure information 102 may be conditioned to indicate which users have direct reports. Conditioning may include, for example, adding a field to each node indicating whether the employee corresponding to the node is a manager or not. This field may be set based on whether or not the reporting structure information 102 indicates that the employee has at least one direct report. In other words, if the node is something other than a leaf node, the field may be set to true.

At operation 406, any attrition may be recorded. This may be performed by comparing the information in the lower-dimensionality projection of the reporting structure to the information in the high-dimensionality team structure database 200 to determine if there any employees in the high-dimensionality team structure database 200 who are not contained in the lower-dimensionality projection of the reporting structure. If so, then the nodes corresponding to those employees in the high-dimensionality team structure database 200 may be marked as "attrition," such as by marking a field in each of the nodes as such.

Pseudocode describing this recording of attrition is as follows in an example embodiment:
1. Gather LDAP_usernames
2. Gather HDTSD_usernames
3. attrition_usernames=HDTSD_usernames−MAP_usernames
4. For each attrition person, team_memberships.RecordAttrition(person_id, today)

Thus, the date the attribution is recorded is also saved in the HDTSD.

Figure 5:
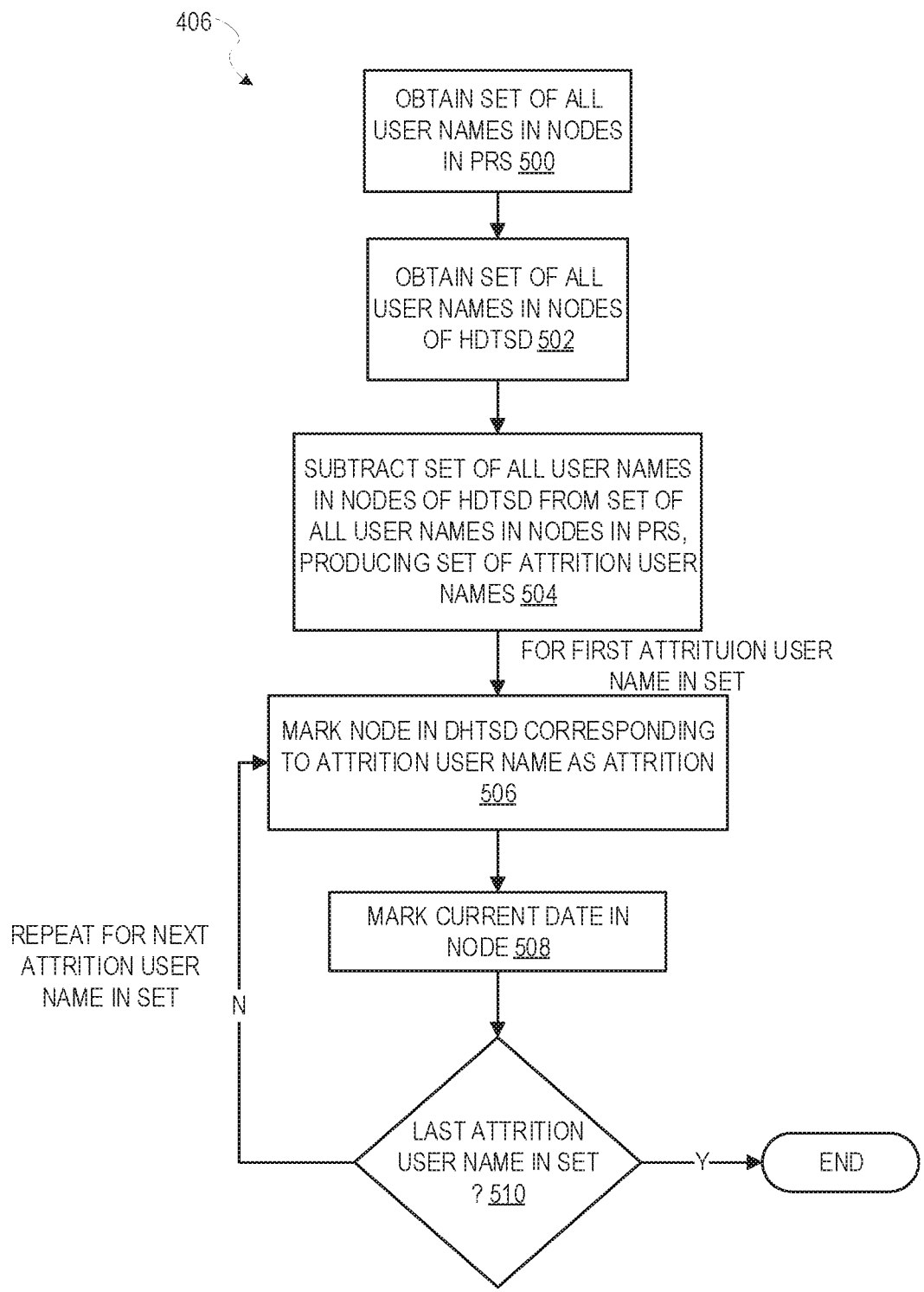
FIG. 5 is a flow diagram illustrating a method of recording attrition in an HDTSD in accordance with an example embodiment.

FIG. 5 is a flow diagram illustrating a method for the operation 406 of recording attrition in an HDTSD in accordance with an example embodiment. At operation 500, a set of all user names in nodes in a PRS are obtained. At operation 502, a set of all user names in nodes of an HDTSD are obtained. At operation 504, the set of all user names in nodes of the HDTSD is subtracted from the set of all user names in the PRS, producing a set of attrition user names. Subtraction in this sense is a set operation to identify which names are contained in the set of names in the HDTSD that are not contained in the set of names from the PRS. The subtraction operation is also referred to as the relative complement (i.e., for sets, B-A is the relative complement of A in B). Then a loop is begun for each user name in the set of attrition user names. At operation 506, a node in the HDTSD corresponding to the user name is marked as attrition. At operation 508, a current date is marked in the node corresponding to the user name in the HDTSD. At operation 510, it is determined if this is the last user name in the set of attrition user names. If not, then the method of operation 406 loops back to operation 506 for the next user name in the set of attrition user names. If so, then the method of operation 406 ends.

It should be noted that in some example embodiments, any persons corresponding to nodes marked as attrition in the HDTSD are removed from any logical teams and/or project teams to which they belong in the HDTSD.

Referring back to FIG. 4, at operation 408, any new employees can be added to the high-dimensionality team structure database 200. This may be performed by comparing the information in the lower-dimensionality projection of the reporting structure to the information in the lower-dimensionality projection of the reporting structure to determine if there any employees in the high-dimensionality team structure database 200 who are not contained in the high-dimensionality team structure database 200. If so, then these employees are added to the high-dimensionality team structure database 200. It should be noted that while the employee can be added as a node in the high-dimensionality team structure database 200, it may be technically difficult to determine which team(s) the employee should be associated with. This indeterminacy will be handled in later steps.

Pseudocode describing this addition of employees is as follows in an example embodiment:
1. Gather LDAP_usernames
2. Gather HDTSD_usernames
3. new_usernames=LDAP_usernames−HDTSD_usernames
4. For each new person, people.AddPerson(first_name, last_name, emp_id, title_id, skill_id)

Figure 6:
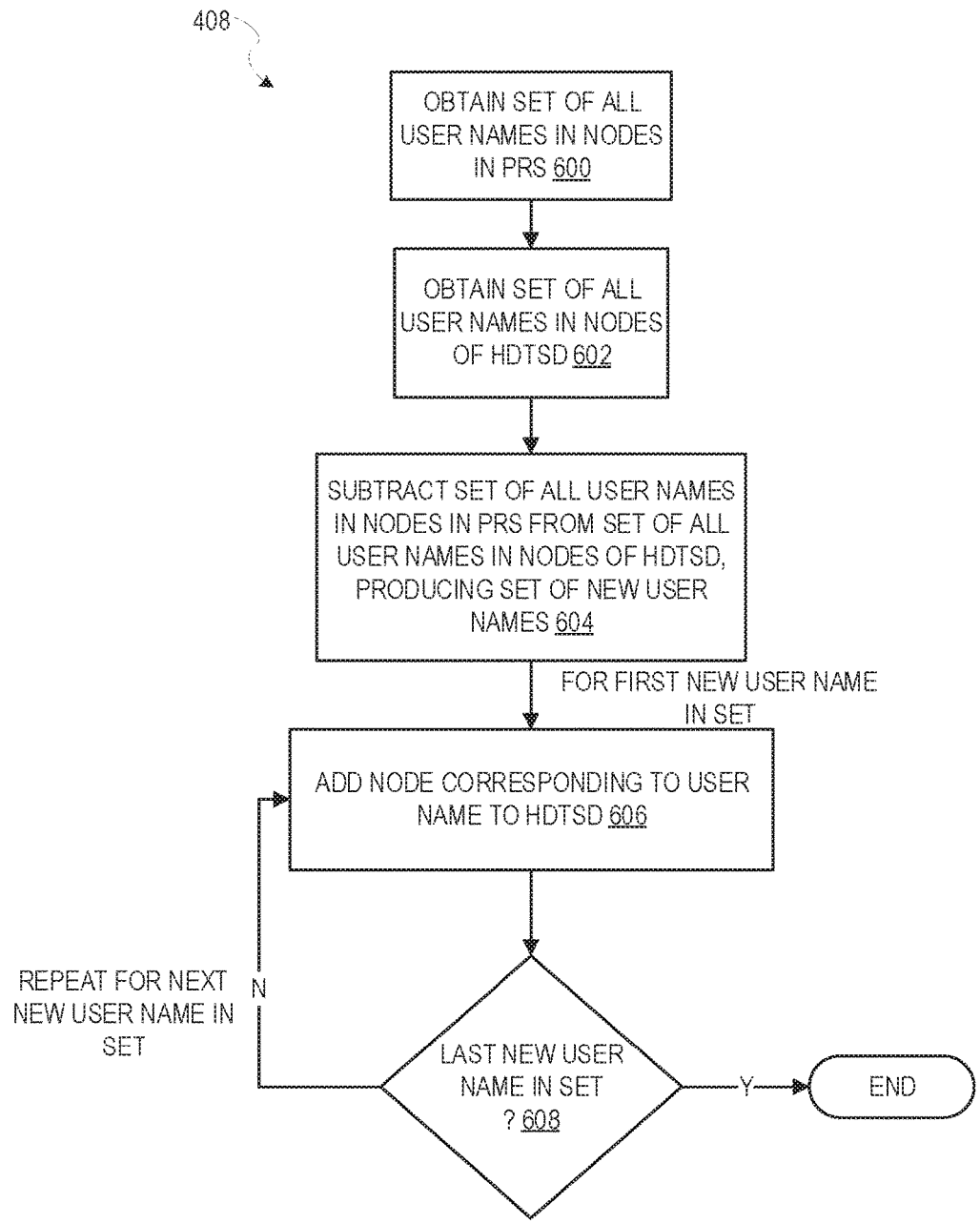
FIG. 6 is a flow diagram illustrating a method of adding new employees to a HDTSD in accordance with an example embodiment.

FIG. 6 is a flow diagram illustrating a method for the operation 408 of adding new employees to a HDTSD in accordance with an example embodiment. At operation 600, a set of all user names in nodes in a PRS are obtained. At operation 602, a set of all user names in nodes of an HDTSD are obtained. At operation 604, the set of all user names in nodes of the PRS is subtracted from the set of all user names in the HDTSD, producing a set of new user names. A loop is then begun for each user name in the set of new user names. At operation 606, a node corresponding to the user name is added to the HDTSD. At operation 608, it is determined if this is the last user name in the set of new user names. If not, then the method of operation 408 loops back to operation 606 for the next user name in the set of new user names. If so, then the method of operation 408 ends.

Referring back to FIG. 4, at operation 410, logical team leads are updated in the high-dimensionality team structure database 200. For all existing logical teams listed in the high-dimensionality team structure database 200, at least one of their members is designated as a lead for the corresponding logical team. New logical team leads may be inferred from the lower-dimensionality projection of the reporting structure and the currently listed leads in the high-dimensionality team structure database 200. For each logical team, the best candidate lead is selected according to a heuristic approach and the logical team's lead is updated accordingly. Pseudocode describing this updating of logical team leads is as follows in an example embodiment:
1. Get all active LDAP nodes
2. Get all active HDTSD logical teams
3. lead_by_team=get_preferred_lead_by_team(LDAP_hash, HDTSD_people, teams)
4. Update each logical team's lead according to lead_by_team The get_preferred_lead_by_team function creates a mapping from team_id to the preferred lead user name. The general idea is that it is desirable to maintain the current lead as much as possible; however, there are certain exceptions. Pseudocode for the get_preferred_lead_by_team is as follows in an example embodiment:

1. For each person in the HDTSD, add their LDAP manager to a list of candidate leads for the logical team they are currently on by:
   a. Getting their current team_id. If this is None, skip this person since the user has been newly added by CreatePeople and does not yet have a logical team.
   b. Getting the associated LDAP record for the person (this is guaranteed to exist because of the RecordAttrition and CreatePeople steps).
   c. If the person's LDAP data says they are a manager, skipping them because their "lead" will implicitly be themselves and so this information is irrelevant at this stage.
   d. From the LDAP data, add the person's "manager username" to a list of candidate leads for the current logical team.
2. For each logical team in the newly created map, select the preferred candidate lead from the list of candidates by:
   a. If the logical team's current lead is one of the candidates, select that person as the current lead.
   b. Otherwise, pick the first candidate in the list.
      i. NOTE: Because the map is generated by users instead of starting with logical teams, it is guaranteed to have a non-empty list of candidate leads for each logical team in the map.
3. Starting from the leaf logical teams first and moving up the team hierarchy:
   a. If the lead for the current logical team matches the lead for any of the subteams (logical teams below the current logical team that are connected to the current logical team in the hierarchy), this represents an "acting" manager structure.
      i. If the lead is still in LDAP, set the lead of the current logical team to this lead in order to maintain this acting manager structure.
   b. If the lead for the current logical team is also the manager of any of the subteam leads, this represents an existing org structure.
      i. If the lead is still in LDAP, set the lead of the current logical team to this lead.

Figure 7:
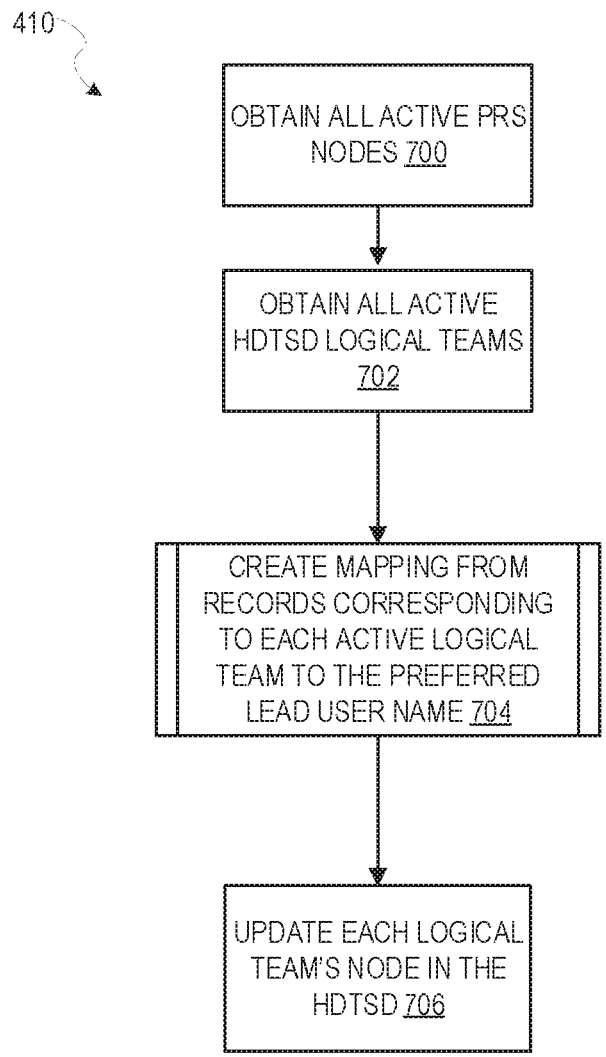
FIG. 7 is a flow diagram illustrating a method for updating logical team leads in an HDTSD in accordance with an example embodiment.

FIG. 7 is a flow diagram illustrating a method for the operation 410 of updating logical team leads in an HDTSD, in accordance with an example embodiment. At operation 700, all active PRS nodes are obtained. At operation 702, all active HDTSD logical teams are obtained. At operation 704, a mapping is created from records corresponding to each active logical team to the preferred lead user name.

Figure 8:
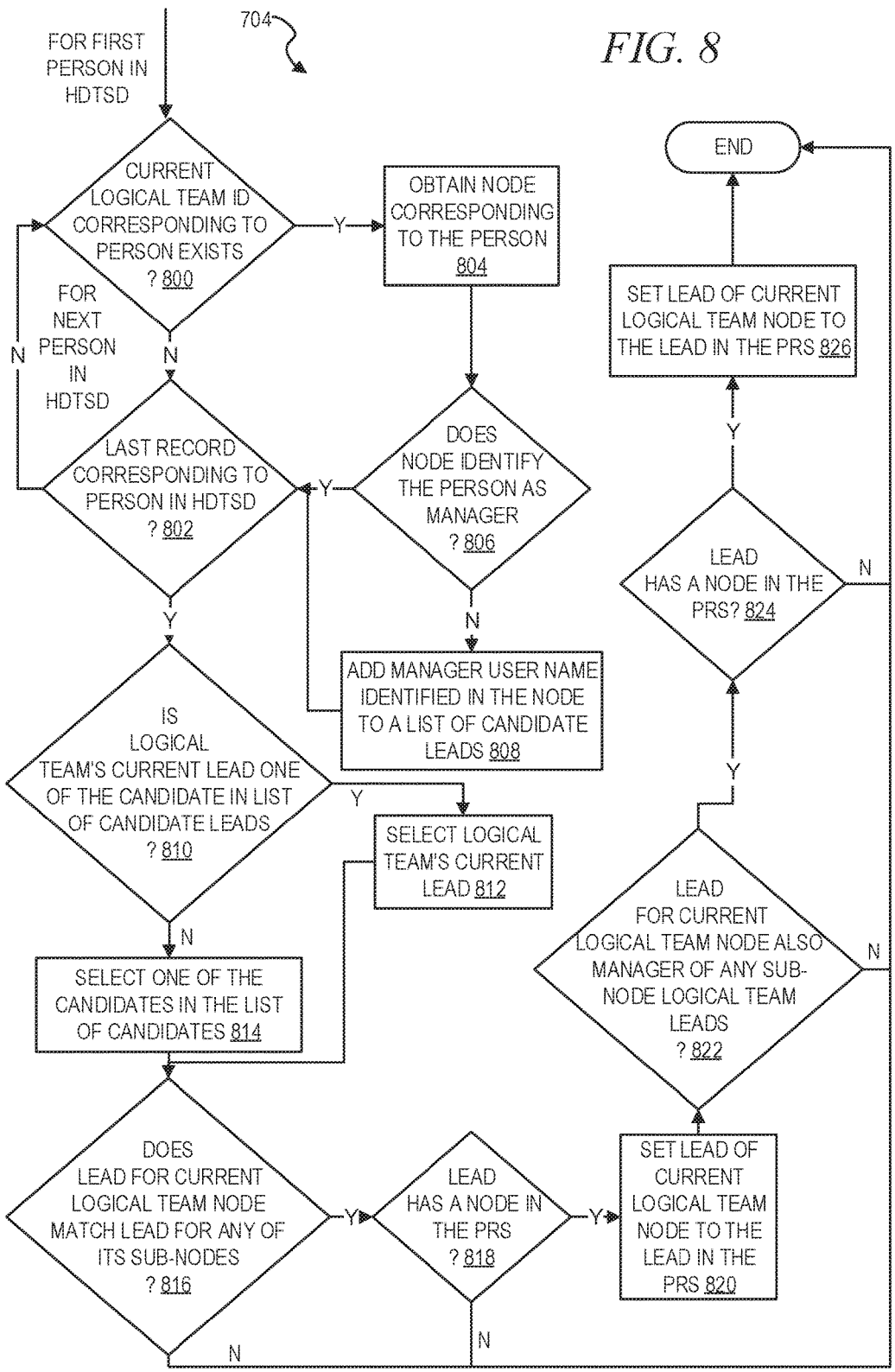
FIG. 8 is a flow diagram illustrating creating a mapping from a record corresponding to the active logical team to the preferred lead user name in accordance with an example embodiment.

FIG. 8 is a flow diagram further illustrating the operation 704 of creating a mapping from a record corresponding to the active logical team to the preferred lead user name in accordance with an example embodiment. A loop is begun for each record corresponding to a person in the HDTSD. At operation 800, it is determined whether a current logical team identification exists for the record. If not, then at operation 802 it is determined if this is the last record corresponding to a person in the HDTSD. If not, then the method of operation 706 loops back to operation 800 for the next record corresponding to a person in the HDTSD. If at operation 800 it is determined that a logical team identification exists for the record, then at operation 804 the node corresponding to the person in the PRS is obtained. At operation 806, it is determined if the node corresponding to the person identifies the person as a manager. If so, then the method of operation 704 skips the person and proceeds to operation 802. If not, however, then at operation 808 a manager user name identified in the node is added to a list of candidate leads for a logical team identified by the logical team identification. Then the method of operation 704 proceeds to operation 802.

Once all the records corresponding to a person in the HDTSD have been handled, then a loop is begun for each logical team having a logical team record in the HDTSD. At operation 810, it is determined if the logical team's current lead is one of the candidates in the list of candidate leads for the logical team. If so, then at operation 812 the logical team's current lead is selected. If not, then at operation 814, one of the candidates in the list of candidate leads for the logical team is selected. In some example embodiments, this may include selecting the first candidate in the list, or a random candidate in the list. In other example embodiments, the list of candidates may be presented to a user for manual selection. In other example embodiments, some other mechanism for selecting one of the candidates is used.

Then each node in a logical team hierarchy is traversed, starting from leaf nodes and moving up. At each level, the following operations are performed. At operation 816, it is determined if the lead for the current logical team node matches the lead for any of its sub-nodes. If so, then at operation 818 it is determined if the lead has a node in the PRS. If so, then at operation 820, the lead of the current logical team node is set to this lead. At operation 822, it is determined if the lead for the current logical team node is also a manager of any sub-node logical team leads. If so, then at operation 824 it is determined if the lead has a node in the PRS. If so, then at operation 826, the lead of the current logical team node is set to this lead.

Referring back to FIG. 7, at operation 706, each logical team's node in the HDTSD is updated based on the results of operation 704.

Referring back to FIG. 4, at operation 412, logical teams are created and added to the high-dimensionality team structure database 200 from the lower-dimensionality projection of the reporting structure. Specifically, a list of employees that are listed as managers in the conditioned reporting structure information in the lower-dimensionality projection of the reporting structure is identified. A topological sort of this list is performed so that managers are ordered based on their level in the hierarchy reporting structure. New logical teams are then created for each of these managers in the high-dimensionality team structure database 200. Pseudocode describing the creation of logical teams is as follows in an example embodiment:
1. LDAP_managers=get all the managers in LDAP
2. HDTSD_leads=get all leads from HDTSD
3. new_leads=LDAP_managers−HDTSD_leads
4. new_leads=toposort(new_leads)
5. For each lead in new_leads:
   a. Get the parent logical team IDs for the lead and pick one, and
   b. Create a new logical team for this lead with the parent logical team from above.

Figure 9:
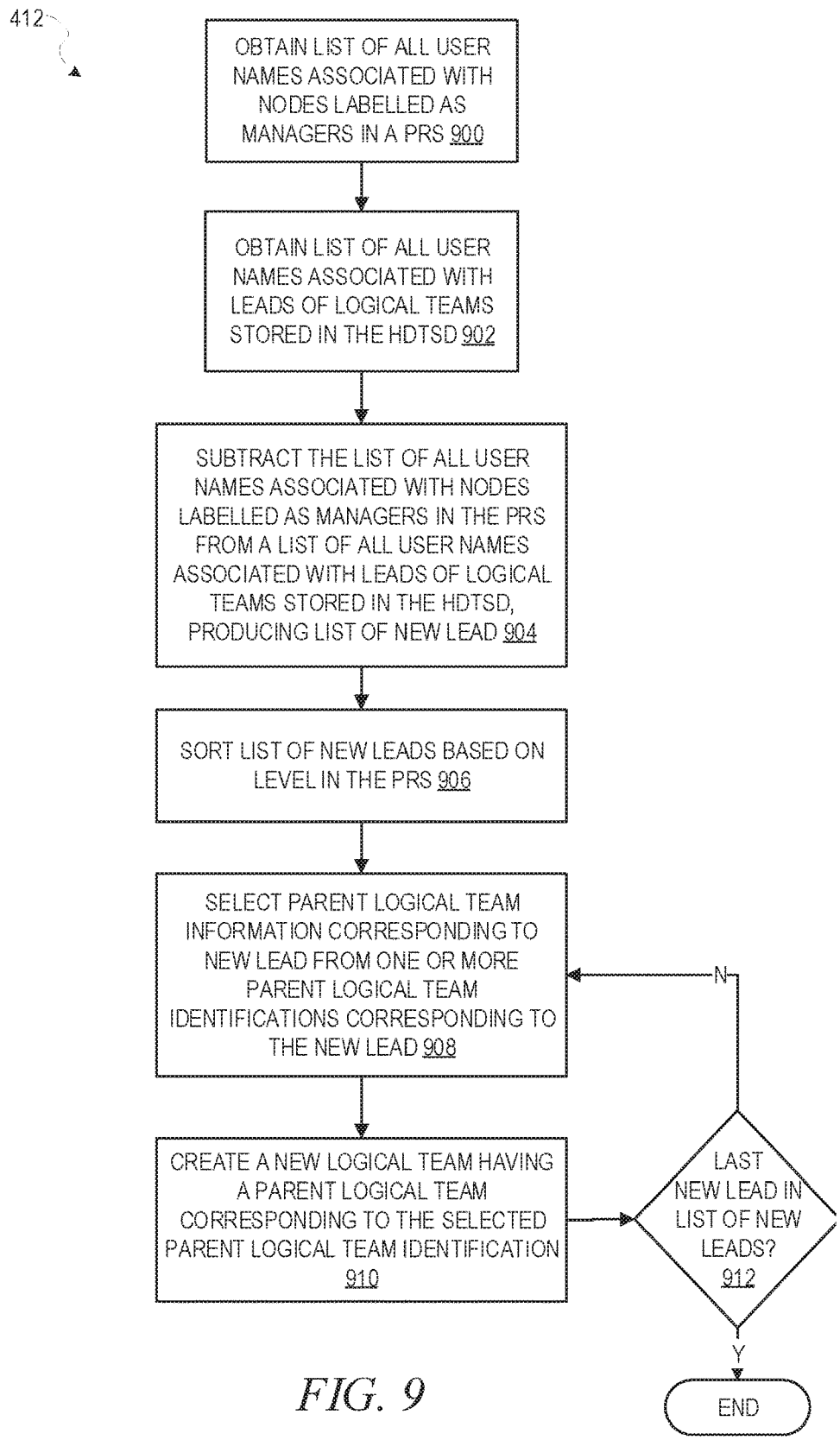
FIG. 9 is a flow diagram illustrating a method for creating logical teams and adding them to an HDTSD in accordance with an example embodiment.

FIG. 9 is a flow diagram illustrating a method for the operation 412 of creating logical teams and adding them to an HDTSD in accordance with an example embodiment. At operation 900, a list of all user names associated with nodes labelled as managers in a PRS is obtained. At operation 902, a list of all user names associated with leads of logical teams stored in the HDTSD is obtained. At operation 904, the list of all user names associated with nodes labelled as managers in the PRS is subtracted from the list of all user names associated with leads of logical teams stored in the HDTSD, producing a list of new leads. At operation 906, the list of new leads is sorted based on level in the PRS. Then a loop is begun for each new lead in the list of new leads. At operation 908, a parent logical team identification corresponding to the new lead is selected from one or more parent logical team identifications corresponding to the new lead. In one example embodiment, this selection is by simply selecting the first parent logical team identification, or a random parent logical team identification, from the options, although in some other example embodiments the possible options are presented to a human for manual selection.

At operation 910, a new logical team having a parent logical team corresponding to the selected parent logical team identification is created in the HDTSD. At operation 912, it is determined if this is the last new lead in the list of new leads. If so, the method of operation 412 ends. If not, then the method of operation 412 loops back to operation 908 for the next new lead in the list.

Referring back to FIG. 4, at operation 414, one or more logical teams are moved. If the reporting structure for the logical team's lead has changed, the logical team is moved to a new parent logical team in the high-dimensionality team structure database 200. This new parent logical team is led by the manager of the logical team's lead. The tricky part to team moving is having the system automatically figure out which logical team has moved. Pseudocode describing this moving of logical teams is as follows in an example embodiment:

1. Select all logical teams for which team_moved(team, LDAP_hash, HDTSD_people, teams) is True.
2. For each of these teams:
    a. Get the current lead username from HDTSD.
    b. Get this lead's manager username.
        i. NOTE: This is guaranteed to be different from the version in HDTSD by virtue of team moved being True.
    c. Gather all logical teams that the lead's manager is the lead of. One of these will be the parent logical team for the current logical team.
    d. Since there may not be a way to determine which of these logical teams is the correct one, the first one may be picked to be the new parent.
        i. NOTE: All required logical teams will have been created by the CreateTeams step.
    e. Move current logical team underneath the new parent team.

The team_moved function uses LDAP and HDTSD data to determine if a logical team has moved. There are two cases to consider. The first is when the lead of the parent logical team is the same as the logical team lead. The second is when the lead of the logical parent team is different from the logical team lead's manager. Pseudocode for this function is as follows in an example embodiment:

1. If lead of parent logical team is the same as the logical team lead, the team hasn't moved.
    a. Get the current HDTSD team info and get the logical team lead, and
    b. Compare this to the lead of the parent logical team.
        i. If there is no lead, go to the next case.
        ii. If the leads are the same, the logical team hasn't moved, so return False.
2. Check if the lead of the parent logical team is different from the logical team lead's manager.
    a. Find the manager of the current logical team's lead.
    b. If the manager is None, that means that the team is the root team, which doesn't move, so return False.
    c. If the logical team's parent team is None, that means it was formerly the root, and so it must have moved.
    d. Otherwise, the lead of the logical team's parent is checked and compared with the manager. If they are different, the logical team has moved; else, the logical team has not moved.

Figure 10:
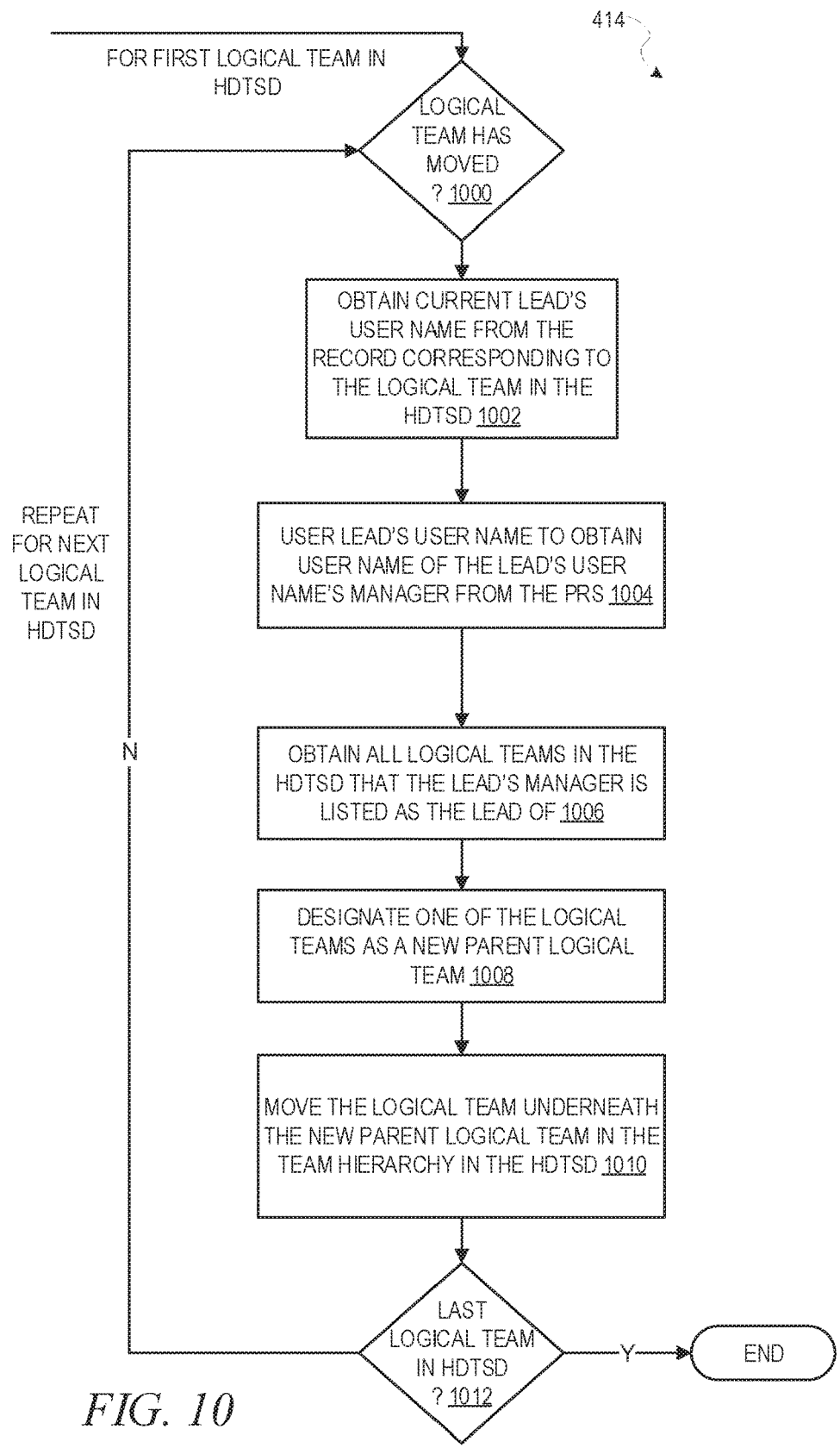
FIG. 10 is a flow diagram illustrating a method for moving one or more logical teams in accordance with an example embodiment.

FIG. 10 is a flow diagram illustrating a method of the operation 414 for moving one or more logical teams in accordance with an example embodiment. A loop is begun for each logical team in the HDTSD. At operation 1002, the current lead's user name from the record corresponding to the logical team in the HDTSD is obtained. At operation 1004, the lead's user name is used to obtain the user name of the lead's user name's manager from the PRS. At operation 1006, all logical teams in the HDTSD that the lead's manager is listed as the lead of are obtained. At operation 1008, one of the logical teams obtained in operation 1006 is designated as a new parent logical team. In an example embodiment, this logical team is selected from the logical teams obtained in operation 1006 by selecting the first logical team, or a random logical team, while in other example embodiments the possible logical teams are presented to a user for manual selection. At operation 1010, the logical team is moved underneath the new parent logical team in the team hierarchy in the HDTSD. At operation 1012, it is determined if this is the last logical team in the HDTSD. If so, then the method of operation 414 ends. If not, then the method of operation 414 loops back to operation 1000 for the next logical team in the HDTSD.

Figure 11:
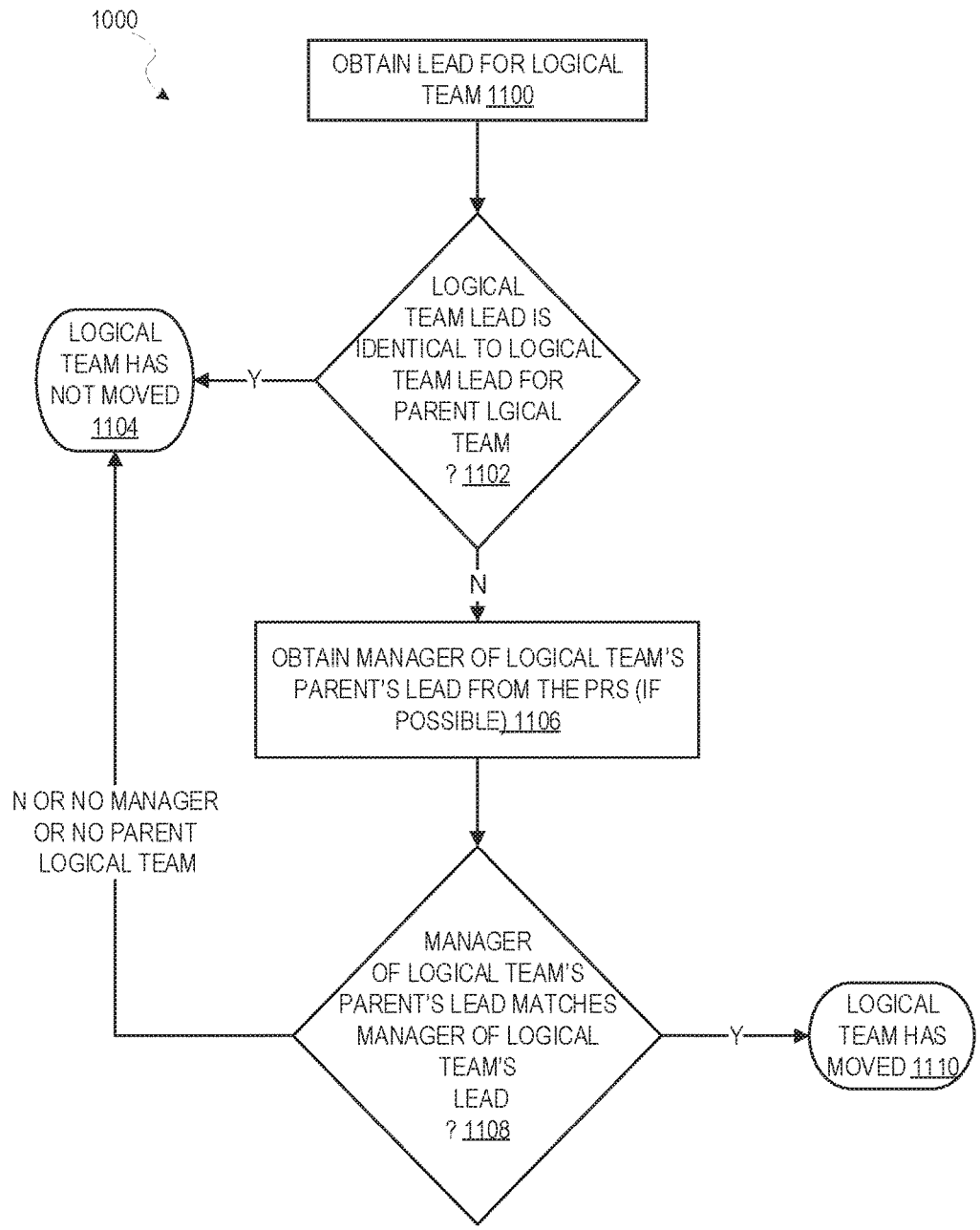
FIG. 11 is a flow diagram illustrating a method of determining if a logical team has moved in accordance with an example embodiment.

FIG. 11 is a flow diagram illustrating method of the operation 1000 for determining if a logical team has moved in accordance with an example embodiment. At operation 1100, the logical team lead for the logical team is obtained from the HDTSD. At operation 1102, it is determined if the logical team lead for the logical team is identical to a logical team lead for a parent logical team of the logical team (if any). If so, then at operation 1104 it is determined that the logical team has not moved and the method of operation 1000 ends. If not, then at operation 1106, a manager of the logical team's parent's lead is obtained from the PRS (if possible). At operation 1108, the manager of the logical team's lead is compared with the manager obtained in operation 1106 to determine if they are the same. If they are the same, then at operation 1110 it is determined that the logical team has moved. If they are not the same, or if there is no manager obtained at operation 1106 or no parent logical team, then it is determined at operation 1104 that the logical team has not moved.

It should be noted that in an example embodiment, if a logical team moves, any project team associated with a person that is part of that logical team also moves.

Referring back to FIG. 4, at operation 416, each employee in the high-dimensionality team structure is examined, and if their lead in a logical team in the high-dimensionality team structure does not match their manager in the lower-dimensionality projection of the reporting structure, then they are moved to a logical team in the high-dimensionality team structure that their manager in the lower-dimensionality projection of the reporting structure is leading. Pseudocode describing this moving of managers is as follows in an example embodiment:

1. For each person:
    a. If title/level has changed, update it.
    b. If the lead from HDTSD is different from their manager:
        i. Get the logical team IDs for their new lead.
        ii. If their current logical team ID is not in this list of logical team IDs, then move the person to the first logical team in the list.

1. NOTE: This ensures that a person stays with their current team as much as possible.

Figure 12:
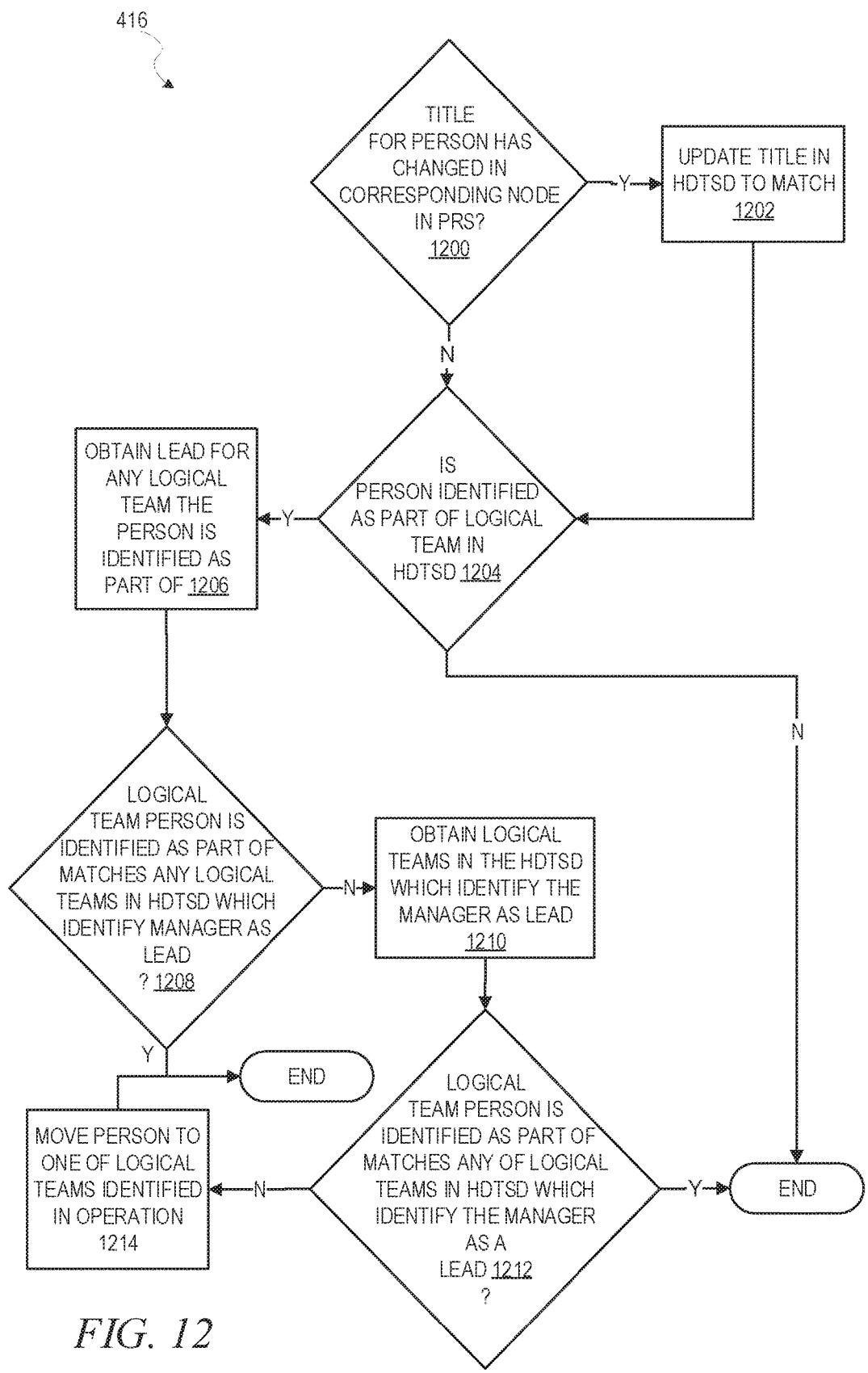
FIG. 12 is a flow diagram illustrating a method for moving persons to different logical teams in accordance with an example embodiment.

FIG. 12 is a flow diagram illustrating a method for the operation 416 of for moving persons to different logical teams in accordance with an example embodiment. A loop is begun for each person in a record in the HDTSD. At operation 1200, it is determined if a title for the person has changed in a corresponding node in the PRS. If so, then at operation 1202 the title is updated in the HDTSD to match. If not, then at operation 1204, it is determined if the person is identified as part of a logical team in the HDTSD. If so, then at operation 1206, the lead for any logical team the person is identified as part of is obtained. If not, then the method of operation 416 ends.

At operation 1208, it is determined if the lead for the logical team the person is identified as part of is the same as a manager listed for the person in the PRS. If so, then, if not, then at operation 1210, any logical teams in the HDTSD which identify the manager as a lead are obtained. At operation 1212, it is determined if the logical team the person is identified as part of matches any of the logical teams in the HDTSD which identify the manager as a lead. If so, then the method of operation 414 ends. If not, then at operation 1214 the person is moved to one of the logical teams identified in operation 1210. In an example embodiment, this logical team is selected by picking the first logical team identified in operation 1210, or a random one of the logical teams identified in operation 1210. In another example embodiment, the possible logical teams identified in operation 1210 are presented to a user for manual selection.

In a further example embodiment, if any person is transferred from one logical team to another logical team, they become unavailable to any previously assigned project teams unless reassigned from new project teams.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module, Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-12 are implemented in some embodiments in the context of a machine and an associated software architecture. The sections below describe representative software architecture(s) and machine (e.g., hardware) architectures) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internee of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 13:
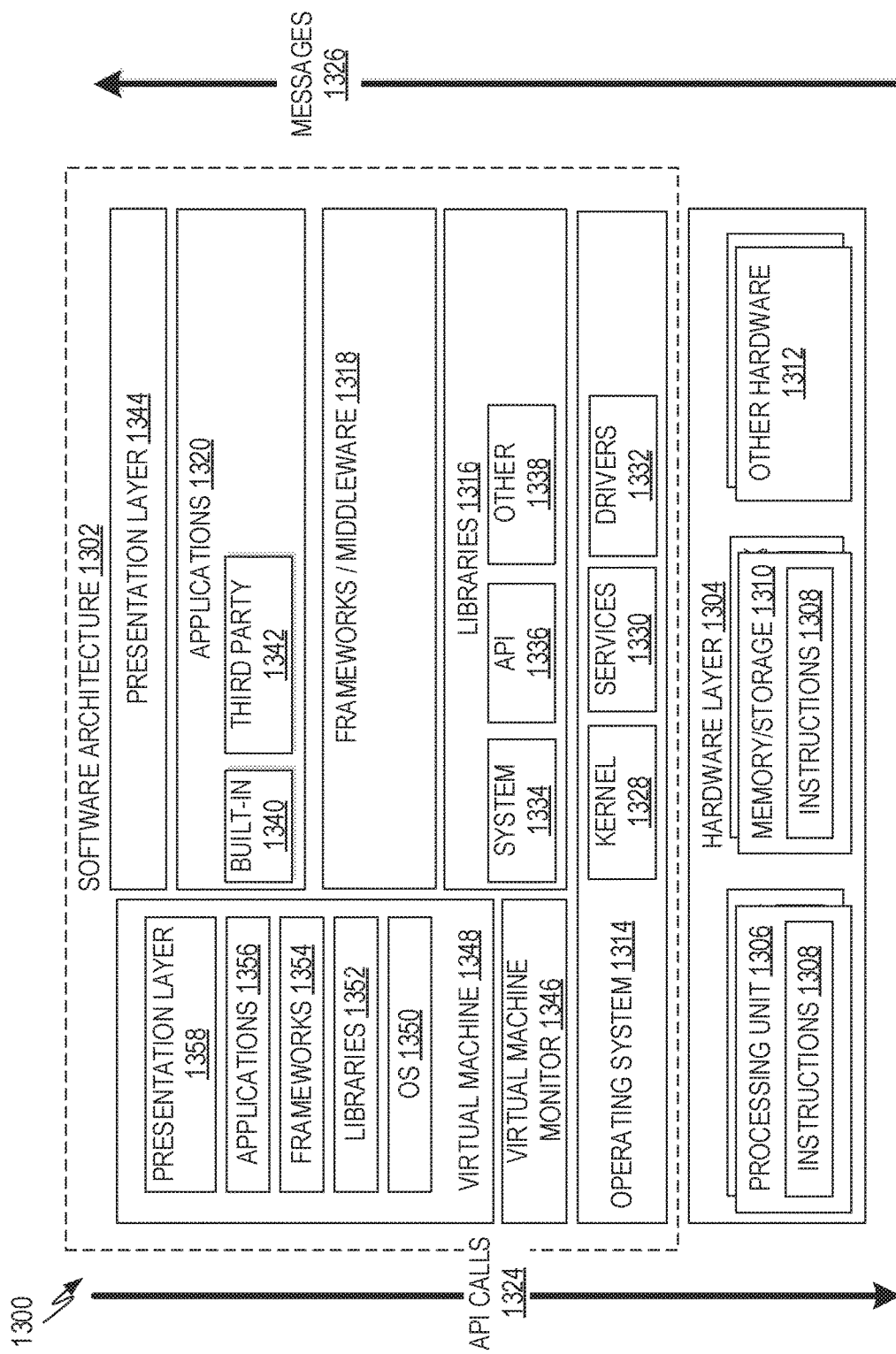
FIG. 13 is a block diagram illustrating a representative software architecture, which may be used in conjunction with various hardware architectures herein described.

FIG. 13 is a block diagram 1300 illustrating a representative software architecture 1302, which may be used in conjunction with various hardware architectures herein described. FIG. 13 is merely a non-limiting example of a software architecture, and it will be appreciated that many other architectures may be implemented to facilitate the functionality described herein. The software architecture 1302 may be executing on hardware such as a machine 1400 of FIG. 14 that includes, among other things, processors 1410, memory/storage 1430, and I/O components 1450. A representative hardware layer 1304 is illustrated and can represent, for example, the machine 1400 of FIG. 14. The representative hardware layer 1304 comprises one or more processing units 1306 having associated executable instructions 1308. The executable instructions 1308 represent the executable instructions of the software architecture 1302, including implementation of the methods, modules, and so forth of FIGS. 1-12. The hardware layer 1304 also includes memory and/or storage modules 1310, which also have the executable instructions 1308. The hardware layer 1304 may also comprise other hardware 1312, which represents any other hardware of the hardware layer 1304, such as the other hardware illustrated as part of the machine 1400.

In the example architecture of FIG. 13, the software architecture 1302 may be conceptualized as a stack of layers where each layer provides particular functionality. For example, the software architecture 1302 may include layers such as an operating system 1314, libraries 1316, frameworks/middleware 1318, applications 1320, and a presentation layer 1344. Operationally, the applications 1320 and/or other components within the layers may invoke API calls 1324 through the software stack and receive responses, returned values, and so forth, illustrated as messages 1326, in response to the API calls 1324. The layers illustrated are representative in nature and not all software architectures have all layers. For example, some mobile or special purpose operating systems may not provide a layer of frameworks/middleware 1318, while others may provide such a layer. Other software architectures may include additional or different layers.

The operating system 1314 may manage hardware resources and provide common services. The operating system 1314 may include, for example, a kernel 1328, services 1330, and drivers 1332. The kernel 1328 may act as an abstraction layer between the hardware and the other software layers. For example, the kernel 1328 may be responsible for memory management, processor management (e.g., scheduling), component management, networking, security settings, and so on. The services 1330 may provide other common services for the other software layers. The drivers 1332 may be responsible for controlling or interfacing with the underlying hardware. For instance, the drivers 1332 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1316 may provide a common infrastructure that may be utilized by the applications 1320 and/or other components and/or layers. The libraries 1316 typically provide functionality that allows other software modules to perform tasks in an easier fashion than by interfacing directly with the underlying operating system 1314 functionality (e.g., kernel 1328, services 1330, and/or drivers 1332). The libraries 1316 may include system libraries 1334 (e.g., C standard library) that may provide functions such as memory allocation functions, string manipulation functions, mathematic functions, and the like. In addition, the libraries 1316 may include API libraries 1336 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1316 may also include a wide variety of other libraries 1338 to provide many other APIs to the applications 1320 and other software components/modules.

The frameworks 1318 (also sometimes referred to as middleware) provide a higher-level common infrastructure that may be utilized by the applications 1320 and/or other software components/modules. For example, the frameworks 1318 may provide various graphic user interface (GUI) functions, high-level resource management, high-level location services, and so forth. The frameworks 1318 may provide a broad spectrum of other APIs that may be utilized by the applications 1320 and/or other software components/modules, some of which may be specific to a particular operating system or platform.

The applications 1320 include built-in applications 1340 and/or third party applications 1342. Examples of representative built-in applications 1340 may include, but are not limited to, a contacts application, a browser application, a book reader application, a location application, a media application, a messaging application, and/or a game application. The third party applications 1342 may include any of the built-in applications 1340 as well as a broad assortment of other applications. In a specific example, the third party application 1342 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1342 may invoke the API calls 1324 provided by the mobile operating system such as the operating system 1314 to facilitate functionality described herein.

The applications 1320 may utilize built-in operating system 1314 functions (e.g., kernel 1328, services 1330, and/or drivers 1332), libraries 1316 (e.g., system libraries 1334, API libraries 1336, and other libraries 1338), and frameworks/middleware 1318 to create user interfaces to interact with users of the system. Alternatively, or additionally, in some systems, interactions with a user may occur through a presentation layer, such as the presentation layer 1344. In these systems, the application/module "logic" can be separated from the aspects of the application/module that interact with a user.

Some software architectures utilize virtual machines. In the example of FIG. 13, this is illustrated by a virtual machine 1348. A virtual machine creates a software environment where applications/modules can execute as if they were executing on a hardware machine (such as the machine 1400 of FIG. 14, for example). A virtual machine is hosted by a host operating system (e.g., operating system 1314 in FIG. 13) and typically, although not always, has a virtual machine monitor 1346, which manages the operation of the virtual machine 1348 as well as the interface with the host operating system (e.g., operating system 1314). A software architecture executes within the virtual machine 1348, such as an operating system 1350, libraries 1352, frameworks/middleware 1354, applications 1356, and/or a presentation layer 1358. These layers of software architecture executing within the virtual machine 1348 can be the same as corresponding layers previously described or may be different.

Example Machine Architecture and Machine-Readable Medium

Figure 14:
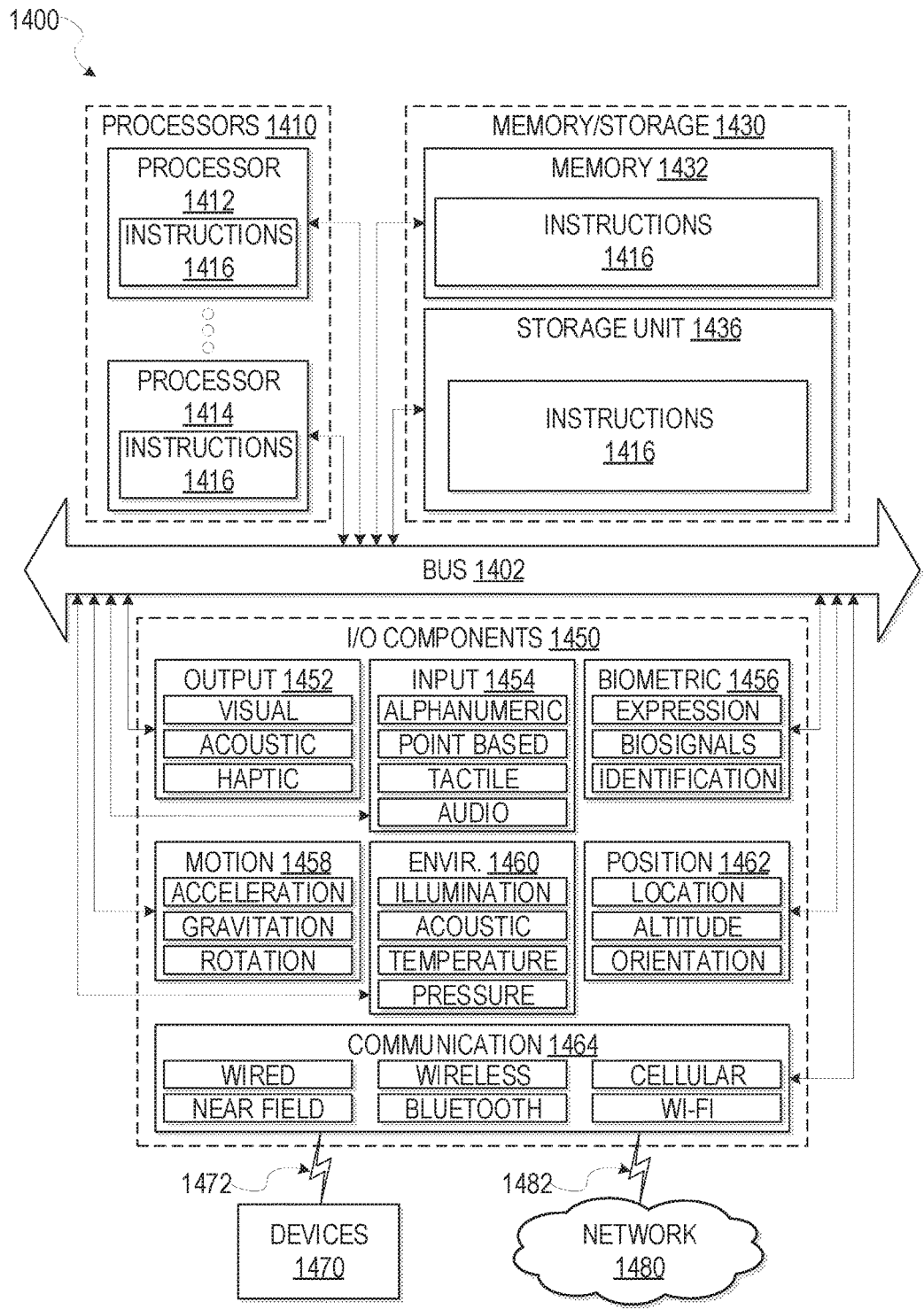
FIG. 14 is a block diagram illustrating components of a machine, according to some example embodiments, able to read instructions from a machine-readable medium (e.g., a machine-readable storage medium) and perform any one or more of the methodologies discussed herein.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. The instructions 1416 transform the general, non-programmed machine into a particular machine programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 may include processors 1410, memory/storage 1430, and I/O components 1450, which may be configured to communicate with each other such as via a bus 1402. In an example embodiment, the processors 1410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1412 and a processor 1414 that may execute the instructions 1416. The term "processor" is intended to include multi-core processors that may comprise two or more independent processors (sometimes referred to as "cores") that may execute instructions 1416 contemporaneously. Although FIG. 14 shows multiple processors 1410, the machine 1400 may include a single processor with a single core, a single processor with multiple cores (e.g., a multi-core processor), multiple processors with a single core, multiple processors with multiples cores, or any combination thereof.

The memory/storage 1430 may include a memory 1432, such as a main memory, or other memory storage, and a storage unit 1436, both accessible to the processors 1410 such as via the bus 1402. The storage unit 1436 and memory 1432 store the instructions 1416 embodying any one or more of the methodologies or functions described herein. The instructions 1416 may also reside, completely or partially, within the memory 1432, within the storage unit 1436, within at least one of the processors 1410 (e.g., within the processor's cache memory), or any suitable combination thereof, during execution thereof by the machine 1400. Accordingly, the memory 1432, the storage unit 1436, and the memory of the processors 1410 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1416. The term "machine-readable medium" shall also be taken to include any medium, or combination of multiple media, that is capable of storing instructions (e.g., instructions 1416) for execution by a machine (e.g., machine 1400), such that the instructions, when executed by one or more processors of the machine (e.g., processors 1410), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1450 may include a wide variety of components to receive input, provide output, produce output, transmit information, exchange information, capture measurements, and so on. The specific I/O components 1450 that are included in a particular machine will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 may include output components 1452 and input components 1454. The output components 1452 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1450 may include biometric components 1456, motion components 1458, environmental components 1460, or position components 1462, among a wide array of other components. For example, the biometric components 1456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1458 may include acceleration sensor components (e.g., accelerometer), gravitation sensor components, rotation sensor components (e.g., gyroscope), and so forth. The environmental components 1460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1462 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 may include a network interface component or other suitable device to interface with the network 1480. In further examples, the communication components 1464 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., a peripheral device coupled via a USB).

Moreover, the communication components 1464 may detect identifiers or include components operable to detect identifiers. For example, the communication components 1464 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1464, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1480 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1480 or a portion of the network 1480 may include a wireless or cellular network and the coupling 1482 may be a Code Division Multiple Access (CDMA) connection, a Global System for Mobile communications (GSM) connection, or another type of cellular or wireless coupling. In this example, the coupling 1482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1416 may be transmitted or received over the network 1480 using a transmission medium via a network interface device (e.g., a network interface component included in the communication components 1464) and utilizing any one of a number of well-known transfer protocols (e.g., HTTP). Similarly, the instructions 1416 may be transmitted or received using a transmission medium via the coupling 1472 (e.g., a peer-to-peer coupling) to the devices 1470. The term "transmission medium" shall be taken to include any intangible medium that is capable of storing, encoding, or carrying the instructions 1416 for execution by the machine 1400, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computerized method of synchronizing updates, the computerized method comprising:

accessing a reporting structure in a high dimensionality reporting structure database;

obtaining a lower dimensionality projection of the reporting structure formed by projecting the reporting structure to a lower dimensional data structure in a projection of the reporting structure (PRS), the lower dimensional data structure including a hierarchy of nodes with connections between nodes, each node corresponding to a person in the organization and the hierarchy of nodes indicating the reporting structure of the organization;

conditioning the lower dimensional data structure in the PRS to indicate nodes whose corresponding person is a manager in the organization;

accessing a high dimensionality team structure database (HDTSD), the HDTSD containing records corresponding to people in an organization and logical team records corresponding to logical teams of people in the organization, each logical team record identifying a person as a team lead, marking, in the HDTSD, any records corresponding to people in the HDTSD who have no corresponding node in the lower dimensional data structure in the PRS as attrition;

adding new records corresponding to people having corresponding nodes in the PRS but lacking records in the HDTSD;

updating team leads for logical team records in the HDTSD based upon people listed as managers in nodes in the lower dimensional data structure in the PRS;

creating one or more logical team records in the HDTSD for any people listed as managers in nodes in the lower dimensional data structure in the PRS who are not listed as leads in the logical team records in the HDTSD; and moving a logical team corresponding to a logical team record in the HDTSD to beneath a new parent logical team record in the HDTSD based on information in the lower dimensional data structure in the PRS.

2. The computerized method of claim 1, further comprising:

moving any person whose lead in a logical team in the HDTSD does not match a manager for the person identified in the lower dimensional data structure in the PRS to a different logical team in the HDTSD.

3. The computerized method of claim 1, wherein the updating team leads includes:

obtaining all active nodes in the lower dimensional data structure in the PRS;

obtaining all logical team records in the HDTSD;

creating a mapping between logical team records and preferred leads; and updating each logical team record based on the mapping.

4. The computerized method of claim 3, wherein the creating a mapping comprises:

for each active node in the lower dimensional data structure in the PRS:

determining that an active node does not correspond to a manager;

adding a person corresponding to the active node that does not correspond to a manager to a list of candidate leads for a logical team associated with the person in the HDTSD; and for each logical team record in the HDTSD:

selecting one of the candidate leads in the list of candidate leads to assign to the logical team record if the lead for the logical team record is not one of the candidate leads in the list of candidate leads.

5. The computerized method of claim 4, wherein the creating one or more logical team records includes:
obtaining all persons listed as managers in the lower dimensional data structure in the PRS;
obtaining all leads listed in logical team records in the HDTSD;
creating a list of all persons listed as managers in the lower dimensional data structure in the PRS who are not listed as leads in the logical team records in the HDTSD;
sorting the list based on each person's corresponding node level in the hierarchy of nodes in the lower dimensional data structure; and
creating a new logical team for each person in the sorted list, the new logical team being associated with a parent logical team for the person.

6. The computerized method of claim 1, wherein the moving a logical team includes:
for each logical team record in the HDTSD, in response to a determination that the logical team corresponding to the logical team record has moved:
obtaining a user name for a lead of the logical team record;
using the user name for the lead to obtain a user name of the lead's manager from the lower dimensional data structure in the PRS;
obtaining all logical team records in the HDTSD that the lead's manager is listed as the lead of;
selecting one of the obtained logical team records in the HDTSD that the lead's manager is listed as the lead of; and
moving the logical team underneath a new parent logical team in the HDTSD.

7. The computerized method of claim 1, wherein the moving of logical teams further comprises:
moving any corresponding project teams along with logical teams.

8. A system comprising:
a computer-readable medium having instructions stored thereon, which, when executed by a processor, cause the system to perform a method for synchronizing updates, the method comprising:
accessing a reporting structure in a high dimensionality reporting structure database;
obtaining a lower dimensionality projection of the reporting structure formed by projecting the reporting structure to a lower dimensional data structure in a projection of the reporting structure (PRS), the lower dimensional data structure including a hierarchy of nodes with connections between nodes, each node corresponding to a person in the organization and the hierarchy of nodes indicating the reporting structure of the organization;
conditioning the lower dimensional data structure in the PRS to indicate nodes whose corresponding person is a manager in the organization;
accessing a high dimensionality team structure database (HDTSD), the HDTSD containing records corresponding to people in an organization and logical team records corresponding to logical teams of people in the organization, each logical team record identifying a person as a team lead,
marking, in the HDTSD, any records corresponding to people in the HDTSD who have no corresponding node in the lower dimensional data structure in the PRS as attrition;
adding new records corresponding to people having corresponding nodes in the PRS but lacking records in the HDTSD;
updating team leads for logical team records in the HDTSD based upon people listed as managers in nodes in the lower dimensional data structure in the PRS;
creating one or more logical team records in the HDTSD for any people listed as managers in nodes in the lower dimensional data structure in the PRS who are not listed as leads in the logical team records in the HDTSD; and
moving a logical team corresponding to a logical team record in the HDTSD to beneath a new parent logical team record in the HDTSD based on information in the lower dimensional data structure in the PRS.

9. The system of claim 8, further comprising:
moving any person whose lead in a logical team in the HDTSD does not match a manager for the person identified in the lower dimensional data structure in the PRS to a different logical team in the HDTSD.

10. The system of claim 8, wherein the updating team leads includes:
obtaining all active nodes in the lower dimensional data structure in the PRS;
obtaining all logical team records in the HDTSD;
creating a mapping between logical team records and preferred leads; and
updating each logical team record based on the mapping.

11. The system of claim 10, wherein the creating a mapping comprises:
for each active node in the lower dimensional data structure in the PRS:
determining that an active node does not correspond to a manager;
adding a person corresponding to the active node that does not correspond to a manager to a list of candidate leads for a logical team associated with the person in the HDTSD; and
for each logical team record in the HDTSD:
selecting one of the candidate leads in the list of candidate leads to assign to the logical team record if the lead for the logical team record is not one of the candidate leads in the list of candidate leads.

12. The system of claim 11, wherein the creating one or more logical team records includes:
obtaining all persons listed as managers in the lower dimensional data structure in the PRS;
obtaining all leads listed in logical team records in the HDTSD;
creating a list of all persons listed as managers in the lower dimensional data structure in the PRS who are not listed as leads in the logical team records in the HDTSD;
sorting the list based on each person's corresponding node level in the hierarchy of nodes in the lower dimensional data structure; and
creating a new logical team for each person in the sorted list, the new logical team being associated with a parent logical team for the person.

13. The system of claim 8, wherein moving a logical team includes:

for each logical team record in the HDTSD, in response to a determination that the logical team corresponding to the logical team record has moved:
obtaining a user name for a lead of the logical team record;
using the user name for the lead to obtain a user name of the lead's manager from the lower dimensional data structure in the PRS;
obtaining all logical team records in the HDTSD that the lead's manager is listed as the lead of;
selecting one of the obtained logical team records in the HDTSD that the lead's manager is listed as the lead of; and
moving the logical team underneath a new parent logical team in the HDTSD.

14. The system of claim 8, wherein the moving of logical teams further comprises:
moving any corresponding project teams along with logical teams.

15. A non-transitory machine-readable storage medium comprising instructions, which when implemented by one or more machines, cause the one or more machines to perform operations for synchronizing updates, the operations comprising:
accessing a reporting structure in a high dimensionality reporting structure database;
obtaining a lower dimensionality projection of the reporting structure formed by projecting the reporting structure to a lower dimensional data structure in a projection of the reporting structure (PRS), the lower dimensional data structure including a hierarchy of nodes with connections between nodes, each node corresponding to a person in the organization and the hierarchy of nodes indicating the reporting structure of the organization;
conditioning the lower dimensional data structure in the PRS to indicate nodes whose corresponding person is a manager in the organization;
accessing a high dimensionality team structure database (HDTSD), the HDTSD containing records corresponding to people in an organization and logical team records corresponding to logical teams of people in the organization, each logical team record identifying a person as a team lead,
marking, in the HDTSD, any records corresponding to people in the HDTSD who have no corresponding node in the lower dimensional data structure in the PRS as attrition;
adding new records corresponding to people having corresponding nodes in the PRS but lacking records in the HDTSD;
updating team leads for logical team records in the HDTSD based upon people listed as managers in nodes in the lower dimensional data structure in the PRS;
creating one or more logical team records in the HDTSD for any people listed as managers in nodes in the lower dimensional data structure in the PRS who are not listed as leads in the logical team records in the HDTSD; and
moving a logical team corresponding to a logical team record in the HDTSD to beneath a new parent logical team record in the HDTSD based on information in the lower dimensional data structure in the PRS.

16. The non-transitory machine-readable storage medium of claim 15, further comprising:
moving any person whose lead in a logical team in the HDTSD does not match a manager for a person identified in the lower dimensional data structure in the PRS to a different logical team in the HDTSD.

17. The non-transitory machine-readable storage medium of claim 15, wherein the updating team leads includes:
obtaining all active nodes in the lower dimensional data structure in the PRS;
obtaining all logical team records in the HDTSD;
creating a mapping between logical team records and preferred leads; and
updating each logical team record based on the mapping.

18. The non-transitory machine-readable storage medium of claim 17, wherein the creating a mapping comprises:
for each active node in the lower dimensional data structure in the PRS:
determining that an active node does not correspond to a manager;
adding a person corresponding to the active node that does not correspond to a manager to a list of candidate leads for a logical team associated with the person in the HDTSD; and
for each logical team record in the HDTSD:
selecting one of the candidate leads in the list of candidate leads to assign to the logical team record if the lead for the logical team record is not one of the candidate leads in the list of candidate leads.

19. The non-transitory machine-readable storage medium of claim 18, wherein the creating one or more logical team records includes:
obtaining all persons listed as managers in the lower dimensional data structure in the PRS;
obtaining all leads listed in logical team records in the HDTSD;
creating a list of all persons listed as managers in the lower dimensional data structure in the PRS who are not listed as leads in the logical team records in the HDTSD;
sorting the list based on each person's corresponding node level in the hierarchy of nodes in the lower dimensional data structure; and
creating a new logical team for each person in the sorted list, the new logical team being associated with a parent logical team for the person.

20. The non-transitory machine-readable storage medium of claim 15, wherein the moving a logical team includes:
for each logical team record in the HDTSD, in response to a determination that the logical team corresponding to the logical team record has moved:
obtaining a user name for a lead of the logical team record;
using the user name for the lead to obtain a user name of the lead's manager from the lower dimensional data structure in the PRS;
obtaining all logical team records in the HDTSD that the lead's manager is listed as the lead of;
selecting one of the obtained logical team records in the HDTSD that the lead's manager is listed as the lead of; and
moving the logical team underneath a new parent logical team in the HDTSD.

* * * * *